(12) United States Patent
Steck

(10) Patent No.: US 12,716,862 B2
(45) Date of Patent: Aug. 25, 2026

(54) MEMBRANE WITH BIODEGRADABLE POLYMER

(71) Applicant: Roche Diabetes Care, Inc., Indianapolis, IN (US)

(72) Inventor: Alexander Steck, Hirschberg (DE)

(73) Assignee: Roche Diabetes Care, Inc., Indianapolis, IN (US)

(*) Notice: Subject to any disclaimer, the term of this patent is extended or adjusted under 35 U.S.C. 154(b) by 85 days.

(21) Appl. No.: 18/587,177

(22) Filed: Feb. 26, 2024

(65) Prior Publication Data

US 2024/0201123 A1 Jun. 20, 2024

Related U.S. Application Data

(63) Continuation of application No. PCT/EP2022/073877, filed on Aug. 29, 2022.

(30) Foreign Application Priority Data

Aug. 30, 2021 (EP) .................................... 21193787

(51) Int. Cl.
*G01N 27/30* (2006.01)
*G01N 27/327* (2006.01)
*G01N 27/411* (2006.01)

(52) U.S. Cl.
CPC ....... *G01N 27/4117* (2013.01); *G01N 27/301* (2013.01); *G01N 27/307* (2013.01); *G01N 27/3272* (2013.01)

(58) Field of Classification Search
CPC ......... G01N 27/30–301; G01N 27/307; G01N 27/327–3272; G01N 27/403
See application file for complete search history.

(56) References Cited

U.S. PATENT DOCUMENTS

2006/0004272 A1 1/2006 Shah et al.
2006/0263763 A1* 11/2006 Simpson ................ C12Q 1/006 600/372
2009/0156920 A1* 6/2009 Kotzan .................. C12Q 1/006 600/347

(Continued)

FOREIGN PATENT DOCUMENTS

KR 2016 0041667 A 4/2016
WO WO 2012/158202 A2 11/2012

OTHER PUBLICATIONS

International Search Report for related PCT/EP2022/073877 mailed Oct. 5, 2022.

*Primary Examiner* — James Lin
*Assistant Examiner* — Vivian A Tran
(74) *Attorney, Agent, or Firm* — Bose McKinney & Evans LLP

(57) ABSTRACT

The present invention relates to an analyte sensor comprising a substrate, at least one first electrode, at least one second electrode and at least one protective layer covering the at least one second electrode. The present invention further relates to a process for manufacturing the inventive analyte sensor as well as to an analyte sensor system comprising an analyte sensor according to the present invention and an electronics unit. The analyte sensor according to the present invention may mainly be used for conducting analyte measurements in a body fluid of a user.

15 Claims, 3 Drawing Sheets

(56) References Cited

U.S. PATENT DOCUMENTS

Figure 1:
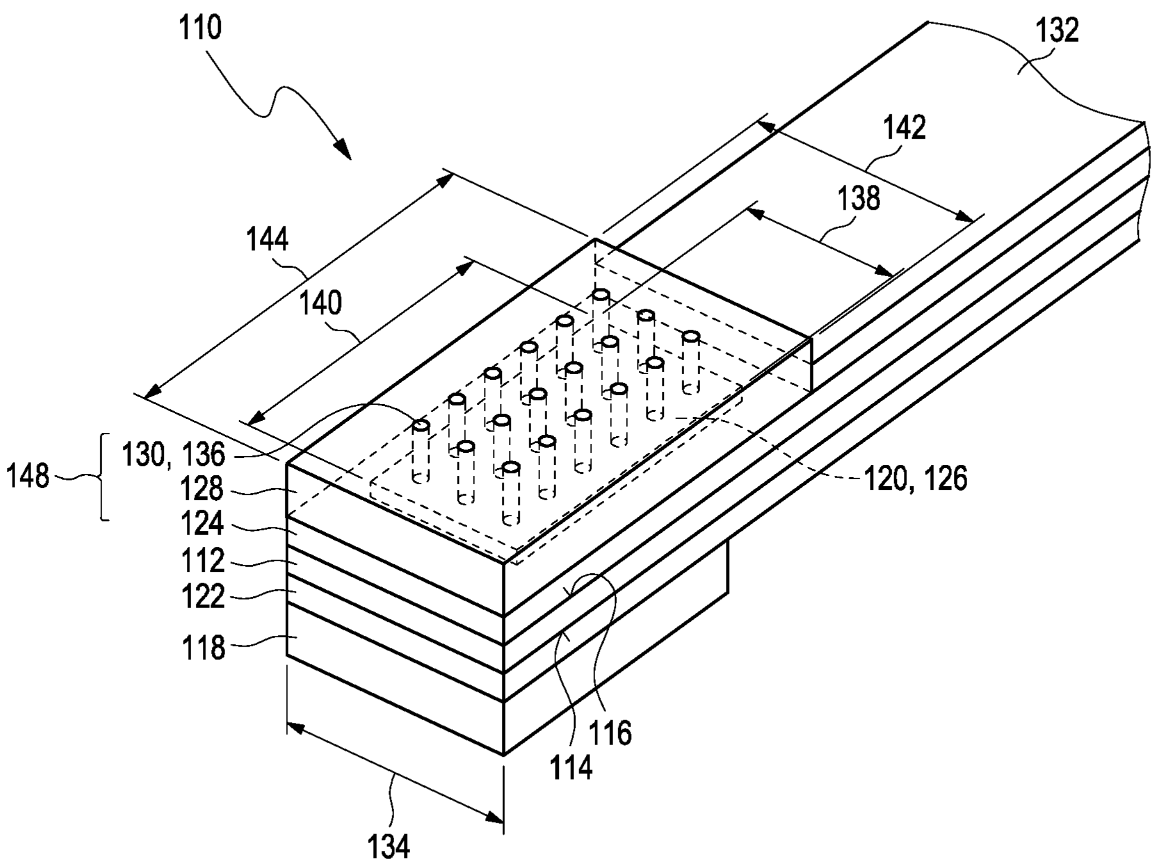

| | | | | |
|---|---|---|---|---|
| 2011/0230735 | A1* | 9/2011 | Wolfe | A61B 5/14503 204/403.14 |
| 2015/0352229 | A1* | 12/2015 | Brill | C12N 5/0068 435/395 |
| 2019/0059792 | A1 | 2/2019 | Kane et al. | |
| 2020/0158679 | A1 | 5/2020 | Vaddiraju et al. | |

* cited by examiner

MEMBRANE WITH BIODEGRADABLE POLYMER

TECHNICAL FIELD

The present invention relates to an analyte sensor comprising a substrate, at least one first electrode, at least one second electrode and at least one protective layer covering the at least one second electrode. The present invention further relates to a process for manufacturing the inventive analyte sensor as well as to an analyte sensor system comprising an analyte sensor according to the present invention and an electronics unit. The analyte sensor according to the present invention may mainly be used for conducting analyte measurements in a body fluid of a user.

BACKGROUND ART

Biosensors for measuring analytes in biological fluids, in particular a sensor which is designed for implantation or subcutaneous insertion to measure body fluids, have to fulfill a variety of functions: on the one hand, the sensor must provide for specific and sensitive measurement without interference from e.g. particular components of body fluids. For this purpose, biosensors are frequently covered with membranes excluding particular compounds in order to allow access to the actual sensing sites only for low molecular weight compounds. While the specificity of biosensors is achieved by using of biorecognition elements, such as enzymes, the sensitivity is often tailored by using of diffusion limiting membranes. Finally, the implanted sensor must be biocompatible, thus there is no inflammation reaction of the body caused, for this purpose, an additional biocompatibility membrane may be applied.

Moreover, with implanted sensors, it is preferred to have sensors which can remain in place for a long period without deterioration of the measurement, in order to spare the patient frequently exchanging the sensor.

Implanted sensors, for example, comprise electrode systems which facilitate measurements of physiologically significant analytes such as, for example, like that of glucose in the patient's body. The working electrodes of such a sensor have electrically conductive enzyme layers in which enzyme molecules are bound which release charge carriers by catalytic conversion of the analyte molecules. In this process, an electrical current is generated as measuring signal whose amplitude correlates to the analyte concentration. These types of sensors are also called electrochemical sensors.

U.S. Pat. No. 9,895,091 B2 discloses electrochemical sensors. These electrochemical sensors can comprise an impermeable dielectric layer on top of Ag/AgCl of a reference electrode. This coating is used to extend the reference electrode's lifetime. The electrochemical sensor disclosed has a layered structure wherein the reference electrode is positioned on top of a working electrode. The working electrode is separated from the reference electrode by an insulating layer.

U.S. Pat. No. 10,470,691 B2 discloses an analyte sensor which comprises a working electrode and a reference electrode. The sensor may comprise an insulator formed of an insulating material. A portion of the insulator may be removed to expose the working electrode and/or the reference electrode.

The manufacturing of the sensors disclosed in the prior art is very time- and cost-consuming. Further, they have drawbacks with regard to their long-term stability.

Problem to be Solved

It is therefore an object of the present invention to provide an analyte sensor which avoids at least in part certain drawbacks of the prior art, in particular with regard to its manufacturability and also with regard to its long-term stability.

SUMMARY OF THE INVENTION

This problem is solved by the analyte sensor according to independent claim 1 as well as by the method for manufacturing this sensor according to independent claim 12 and by the analyte sensor system according to independent claim 15. Preferred embodiments of the invention which may be realized in an isolated way or in any arbitrary combination are disclosed in the dependent claims and throughout the specification.

The inventive analyte sensor is particularly easy to manufacture as it can be produced by a roll-to-roll process It furthermore exhibits an excellent long-term stability and a stable sensitivity. In particular, the inventive analyte sensor allows the analyte sensor to comprise only two electrodes instead of three, which makes the inventive analyte sensor particularly cost-efficient. In particular, the inventive analyte sensor allows a controlled formation of openings within the protective layer. These openings grant access to the second electrode, thereby increasing the long-term stability of the sensor. By specific selection of the biodegradable polymer, the speed with which the openings form can be adjusted. Further, the analyte sensor has an improved biocompatibility. In a preferred embodiment of the analyte sensor in which the protective layer additionally comprises at least one pharmaceutical compound, the risk of immune responses is decreased.

As used in the following, the terms "have", "comprise", or "include" or any arbitrary grammatical variations thereof are used in an exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i. e. a situation in which A solely and exclusively consists of B) and to a situation in which, besides B, one or more further elements are present in entity A, such as element C, elements C and D or even further elements.

Further, it should be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, notwithstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restrictions regarding alternative embodiments of the invention, without any restrictions regarding the scope of the invention and without any restrictions regarding the possibility of combining the features introduced in such way with the optional or nonfunctional features of the invention.

In a first aspect of the present invention an analyte sensor for determining at least one analyte, the analyte sensor comprising:

- a substrate comprising at least one first conductive material and at least one second conductive material,
- at least one first electrode which is located on the at least one first conductive material,
- at least one second electrode which is located on the at least one second conductive material the at least one second electrode comprising silver,
- at least one protective layer covering the at least one second electrode fully, wherein the protective layer comprises a mixture of at least one biodegradable polymer and at least one non-biodegradable hydrophobic polymer is disclosed.

The term "analyte sensor" within the context of the present invention may refer to any device configured for the detection of an analyte.

The term "analyte" may refer to any arbitrary element, component or compound which may be present in a body fluid and the concentration of which may be of interest for the user. Preferably, the analyte may be or may comprise an arbitrary chemical substance or chemical compound which may take part in the metabolism of the user, such as at least one metabolite. As an example, the analyte may be selected from the group consisting of glucose, ketones, cholesterol, triglycerides, and lactate. Additionally or alternatively, however, other types of analytes and/or any combination of analytes may be determined. Preferably, the analyte is glucose.

Thus, the analyte sensor is preferably a biosensor. Further preferably, the analyte sensor is an electrochemical sensor. The term "electrochemical sensor" refers to a sensor which is adapted for performing at least one electrochemical measurement, in particular, a plurality or series of electrochemical measurements, in order to detect the analyte comprised within the body fluid by using an amperometric method. Especially, the term "electrochemical measurement" refers to the detection of an electrochemically detectable property of the analyte, such as an electrochemical detection reaction, by employing amperometric methods. Thus, for example, the electrochemical detection may be carried out by applying and comparing one or more electrical potentials. Specifically, the electrochemical sensor may be adapted to generate at least one electrical measurement signal which may directly or indirectly indicate the presence and/or absence of the electrochemical detection reaction, such as at least one current signal and/or at least one voltage signal. The measurement may be a quantitative and/or a qualitative measurement.

In a particularly preferred embodiment of the present invention, the analyte sensor may be fully or partially implantable and may, thus, be adapted for performing the detection of the analyte in the body fluid in the subcutaneous tissue, in particular, an interstitial fluid. As used herein the terms "implantable" or "subcutaneous" refer to be fully or at least partially arranged within the body tissue of the user which may be a human or an animal, preferably partially arranged within the body tissue of the user. For this purpose, the analyte sensor may comprise an insertable portion, wherein the term "insertable portion" may generally refer to a part or component of an element configured to be insertable into an arbitrary body tissue while other parts or components may remain outside of the body tissue. Preferably, the body tissue is skin. Preferably, the insertable portion may fully or partially comprise a biocompatible membrane, i.e. a surface which may have as little detrimental effects on the user, the patient, or the body tissue as possible, at least during typical durations of use.

Thus, preferably, the analyte sensor of the present invention is an implantable sensor.

As generally used, the term "body fluid" may refer to fluid, in particular liquid, which may typically be present in a body or a body tissue of the user or the patient and/or which may be produced by the body of the user or the patient. Preferably, the body fluid may be selected from the group consisting of blood and interstitial fluid. However, additionally or alternatively, one or more other types of body fluid may be used, such as saliva, tear fluid, urine or other body fluids. During the detection of the analyte, the body fluid may be present within the body or body tissue. Thus, the analyte sensor may be configured for detecting the analyte within the body tissue. The analyte sensor is in one embodiment suitable for short-term application, e. g. 3 to 21 days, or for long-term application e. g. 1 to 12 months. During its application, the analyte may be determined by continuous or discontinuous measurements.

The analyte sensor of the invention comprises at least one first electrode and at least one second electrode. Thus the analyte sensor of the invention is preferably an electrochemical sensor. Preferably, the at least one first electrode is at least one working electrode. Therefore, an analyte sensor is preferred wherein the at least one first electrode is at least one working electrode.

The analyte sensor of the invention is preferably an electrochemical sensor comprising at least one working electrode and at least one second electrode. More preferably, the sensor is an amperometric electrochemical sensor comprising at least one working electrode and the at least one second electrode. The working electrode is sensitive for the analyte to be measured at a polarization voltage which may be applied between the at least one working electrode and the at least one second electrode and which may be regulated by a potentiostat. A measurement signal may be provided as an electric current between the at least one first electrode, in particular the at least one working electrode, and the at least one second electrode.

The inventive analyte sensor comprises a substrate which comprises at least one first conductive material and at least one second conductive material.

Within the context of the present invention, the term "substrate" specifically may refer, without limitation, to any kind of material or combination of materials which is suitable to form a carrier layer to support the at least one first electrode and the at least one second electrode. In particular, the substrate may comprise an electrically insulating material. Within the context of the present invention "electrically insulating material" is a broad term and given its ordinary and customary meaning to a person of ordinary skill in the art. The term "electrically insulating material" may also encompass a dielectric material. The term specifically may refer, without limitation, to a material or combination of materials which prevent the transfer of electrical charges and which do not sustain a significant electrical current. Specifically, without limiting other possibilities, the at least one electrically insulating material may be or may comprise at least one insulating resin such as insulating epoxy resins used in manufacturing of electronic printed circuit boards. In particular, it may comprise or be at least one thermoplastic material such as a polycarbonate, a polyester, a polyvinylchloride, a polyurethane, a polyethylene, a polypropylene, polystyrene, a polyether, a polyamide, a polyimide, polytetrafluoroethylene, a polyacrylate or a copolymer thereof. In an embodiment, the at least one electrically insulating material may comprise or may be alumina. Suitable polyesters are, for example, selected from the group consisting of polyethylene terephthalate (PET), glycol modified polyethylene terephthalate, and polyethylene naphthalate. A suitable polyethylene is for example selected from the group consisting of high density polyethylene (HDPE) and low density polyethylene (LDPE). A preferred polystyrene is poly(4-vinylpyridine-co-styrene).

Thus in a preferred embodiment the substrate comprises at least one electrically insulating material selected from the group consisting of an insulating epoxy resin, a polycarbonate, a polyester, a polyvinylchloride, a polyurethane, a polyethylene, a polypropylene, polystyrene, a polyether, a polyamide, a polyimide, polyacrylate, polytetrafluoroethylene or a copolymer thereof, and alumina.

It is preferred that the substrate of the analyte sensor comprises a first and a second side. Thus an analyte sensor is preferred wherein the substrate comprises a first side and a second side.

To the person skilled in the art it is clear that the first side and the second side are different from one another.

In an embodiment the first side and the second side are positioned opposite each other. Therefore, in an embodiment the substrate comprises two opposing sides, the first side and the second side opposing the first side. As generally used, the term "side" refers to a surface of the substrate. Herein, the terms "first" and "second" are considered as description without specifying an order and without excluding an embodiment in which other elements of the same kind may be present.

Thus it is preferred that in the analyte sensor according to the present invention the first side and the second side of the substrate are positioned opposite each other.

It is furthermore preferred that the substrate comprises a first side and a second side and that the at least one first conductive material is located on the first side of the substrate and that the at least one second conductive material is located on the second side of the substrate.

The substrate may be a flat substrate. The substrate may have an elongated shape, such as a strip shape or a bar shape. As generally used, the term "elongated shape" indicates that each surface of the planar body has an extension in a direction along the elongation which exceeds an extension perpendicular hereto by at least a factor of 2, at least a factor of 5, at least a factor of 10 or even at least a factor of 20 or more. The direction of the substrate which has the largest extension is usually referred to as "length of the substrate". The smallest direction which is perpendicular to the length of the substrate is typically referred to as "thickness of the substrate". The direction which is perpendicular to both, the length of the substrate and the thickness of the substrate, is typically referred to as "width of the substrate".

Specifically the substrate may be flexible and/or deformable. In particular, the substrate may be bendable. Thus, as an example, the substrate may be a thin, flexible substrate. As an example, the substrate may have a thickness of 50 μm to 1 mm, specifically a thickness of 80 μm to 500 μm, such as 110 μm to 250 μm.

The substrate may have a length which is preferably less than 50 mm, such as a length of 30 mm or less, e.g. a length of 5 mm to 30 mm.

If the analyte sensor is an implantable sensor, preferably a partially implantable sensor, then the length of the substrate is measured in the insertion direction of the analyte sensor. The length of the substrate refers to the total length of the substrate. The "total length of the substrate" is the overall length of the substrate, including the insertable portion of the substrate which is within the body tissue of the user during use of the analyte sensor and the on body portion of the substrate. The "on body portion of the substrate" is the portion of the substrate which may, for example be connected to the electronics unit.

The substrate typically has a width in the range from 100 μm to 1 mm, preferably in the range from 300 μm to 800 μm.

The substrate comprises at least one first conductive material and at least one second conductive material. The at least one first conductive material and the at least one second conductive material are preferably capable of sustaining electrical current. Thus, the at least one first conductive material is in particular at least one first electrically conductive material. The at least one second conductive material is in particular at least one second electrically conductive material.

"Electrically conductive material" within the context of the present invention refers to a material being capable of sustaining an electrical current. Thus, an electrically conductive material may be selected from the group consisting of metals, and nonmetallic electrically conductive materials.

Suitable metals are known as such and are, for example, selected from the group consisting of gold, nickel, platinum, and palladium, wherein gold is particularly preferred. Also gold paste is suitable as electrically conductive material.

Suitable nonmetallic electrically conductive materials are for example selected from the group consisting of carbon, carbon paste, doped metal oxides, such as fluorine doped tin oxide (FTO) and indium doped tin oxide (ITO), or conductive polymers. Suitable conductive polymers are, for example polyaniline and/or poly-3,4-ethylenedioxythiophene (PEDOT). Carbon paste may comprise, for example, carbon and a solvent such as diethylene glycol butyl ether and at least one binder such as vinyl chloride co- and terpolymers. Carbon paste is known as such.

Thus, the at least one electrically conductive material preferably is selected from the group consisting of gold, nickel, platinum, palladium, carbon, carbon paste, polyaniline and poly-3,4-ethylenedioxythiophene (PEDOT), particularly preferred, the at least one electrically conductive material is selected from the group consisting of gold, carbon, and carbon paste. More preferably, the at least one electrically conductive material consists essentially of gold and/or carbon and/or carbon paste. In an embodiment, the at least one electrically conductive material has a layered structure wherein a first layer consists of gold and a second layer consists of carbon and/or carbon paste. In this embodiment, preferably, gold is positioned on top of the first side of the substrate and on top of the gold, carbon and/or carbon paste is positioned.

The embodiments and preferences described for the at least one electrically conductive material apply independently of one another for the at least one first electrically conductive material and for the at least one second electrically conductive material.

The substrate may comprise the at least one first conductive material, in particular the at least one first electrically conductive material, in the form of at least one first conductive trace. The substrate may comprise the at least one second conductive material, in particular the at least one second electrically conductive material, in the form of at least one second conductive trace.

The term "conductive trace" within the context of the present invention refers, without limitations, to an electrically conductive strip, layer, wire or other type of electrical conductor. The conductive trace may have a thickness of at least 0.05 μm, preferably of at least 0.5 μm, more preferably of at least 5 μm, specifically of at least 7 μm, or at least 10 μm. In the case where the conductive trace comprises carbon or is carbon, the conductive trace may specifically have a thickness of at least 7 μm, more specifically of at least 10 μm. Specifically, in the case where the conductive trace is gold, the conductive trace may have a thickness of at least 50 nm, more specifically of at least 100 nm.

The at least one electrically conductive material may be positioned on the substrate by any known method, for example via chemical vapor deposition (CVD), physical vapor deposition (PVD), or a wet-coating process. Wet-coating processes are known as such. A suitable wet-coating process is for example selected from the group consisting of spin-coating, spray-coating, doctor-blading, printing, dispensing, slot-coating, dip coating and screen printing.

The analyte sensor comprises at least one first electrode. The at least one first electrode is preferably at least one working electrode. The analyte sensor comprises at least one first electrode preferably positioned on the first side of the substrate. Preferably the at least one first electrode is positioned only on the first side of the substrate. This means, within the context of the present invention, that in an embodiment the second side does not comprise at least one first electrode.

The at least one first electrode is preferably adapted for detecting the analyte, in particular, the at least one first electrode is an electrode of the analyte sensor which is sensitive for the analyte. Thus, the at least one first electrode is preferably also referred to as at least one working electrode, in particular, the at least one first electrode is preferably at least one working electrode. Therefore, the at least one first electrode preferably comprises at least one enzyme. The at least one first electrode may comprise precisely one enzyme or a mixture of two or more enzymes. Precisely one enzyme is preferred. Specifically, the enzyme is capable of catalyzing a chemical reaction converting the analyte, in particular glucose. Even more specifically the at least one enzyme is selected from the group consisting of a glucose oxidase (EC 1.1.3.4), a hexose oxidase (EC 1.1.3.5), an (S)-2 hydroxy acid oxidase (EC 1.1.3.15), a cholesterol oxidase (EC 1.1.3.6), a glucose dehydrogenase, a galactose oxidase (EC 1.1.3.9), an alcohol oxidase (EC 1.1.3.13), an L-glutamate oxidase (EC 1.4.3.11), and an L-aspartate oxidase (EC 1.4.3.16). In particular, the at least one enzyme is a glucose oxidase (GOx) and/or modifications thereof.

The at least one enzyme may be comprised in a sensing material. The sensing material which comprises the at least one enzyme may be located partially on the first conductive material. In particular, the sensing material may cover a portion of the at least one first conductive trace. In particular, the sensing material preferably forms a layer on the at least one first conductive material, thereby forming the at least one first electrode.

The sensing material may be applied by any known method to the at least one first conductive material, for example by a wet-coating process. A suitable wet-coating process is for example selected from the group consisting of spin-coating, spray-coating, doctor-blading, printing, dispensing, slot-coating, dip coating and screen printing. After the wet-coating process, the layer of the sensing material may be further treated. Such treatments are for example drying treatment, curing treatments and/or laser ablation treatments. Such treatments are known as such.

The term "sensing material", as used herein, specifically may refer, without limitation, to a material that may be or may comprise at least a polymeric material; specifically it may be or may comprise at least a polymeric material and at least a metal containing complex. The metal containing complex may be selected from the group consisting of transition metal element complexes, specifically the metal containing complex may be selected from osmium-complexes, ruthenium-complexes, vanadium-complexes, cobalt-complexes, and iron-complexes, such as ferrocenes, such as 2-aminoethylferrocene. Even more specifically, the sensing material may be a polymeric transition metal complex as described for example in WO 01/36660 A2, the content of which is included by reference. In particular, the sensing material may comprise a modified poly(vinylpyridine) backbone loaded with poly(bi-imidizyl) Os complexes covalently coupled through a bidentate linkage. A suitable sensing material is further described in Feldmann et al, Diabetes Technology & Therapeutics, 5 (5), 2003, 769-779, the content of which is included by reference. Suitable sensing materials further may include ferrocene-containing polyacrylamide-based viologen-modified redox polymer, pyrrole-2,2'-azino-bis(3-ethylbenzthiazoline-6-sulfonic acid) (ABTS)-pyrene, Naphthoquinone-LPEI. The polymeric transition metal complex may represent a redox mediator incorporated into a cross-linked redox polymer network. This is advantageous as it may facilitate electron transfer between the at least one enzyme or analyte and the conductive trace. In order to avoid a sensor drift, the redox mediator and the enzyme may be covalently incorporated into a polymeric structure.

In an embodiment the sensing material may comprise a polymeric material and $MnO_2$-particles or any other material catalyzing hydrogen peroxide oxidation reaction as well as the at least one enzyme. Another material catalyzing hydrogen peroxide oxidation reaction is Pt (platinum).

Moreover, the sensing material may additionally comprise at least one crosslinker; the crosslinker may for example be capable of crosslinking at least part of the sensing material. Specifically the sensing material may comprise at least one crosslinker selected from UV-curable crosslinkers and chemical crosslinkers; more specifically the sensing material comprises a chemical crosslinker. Alternatively, the sensing material may be free of any crosslinker. "Free of any crosslinker" as used herein, specifically may refer to a concentration of crosslinker in the range from 0 to 0.5 wt-% based on the dry weight of the sensing material. The term "dry weight" as used herein refers to the dry matter of the respective material, e.g. the material without the addition of any water or other solvent.

Suitable chemical crosslinkers according to the present invention are preferably selected from the group consisting of epoxide based crosslinkers, such as diglycidyl ethers like poly(ethylene glycol) di-glycidyl ether (PEG-DGE) and poly(propylene glycol) diglycidyl ether; trifunctional short chain epoxides; anhydrides; diglycidyl ethers such as Resorcinol diglycidyl ether, Bi-sphenol A diglycidyl ether, Diglycidyl 1,2-cyclohexanedicarboxylate, Poly(ethylene glycol) diglycidyl ether, Glycerol diglycidyl ether, 1,4-Butanediol diglycidyl ether, Poly(propylene glycol) diglycidyl ether, Bisphenol diglycidyl ether, Poly(dimethylsiloxane), diglycidyl ether, Neopentyl glycol diglycidyl ether, 1,2,7,8-Diepoxyoctane, 1,3-Glycidoxypropyl-1,1,3,3-Tetramethyldisioxane; triglycidyl ethers such as N,N-Diglycidyl-4-glycidyloxyaniline, Trimethylolpropane triglycidyl ether; and tetraglycidyl ethers such as Tetrakisepoxy cyclosiloxane, Pentaerythritol tetraglycidyl ether, tetraglycidyl-4,4'-methylenebisbenzenamine.

The term "chemical crosslinker" as used herein, specifically may refer, without limitation, to a crosslinker that is capable of initiating a chemical reaction generating a cross-linked molecular network and/or a cross-linked polymer when exposed to heat. "Exposed to heat" may refer to being exposed to a temperature above 15° C., specifically to a temperature above 20° C.; more specifically to a temperature in the range from 20° C. to 50° C. and even more specifically to a temperature in the range from 20° C. to 25° C. More specifically, chemical crosslinkers may initiate crosslinking of the sensing material when exposed to heat.

The term "UV-curable crosslinker" as used herein, specifically may refer, without limitation, to the ability of a chemical substance of initiating a photochemical reaction generating a crosslinked molecular network and/or a cross-linked polymer when irradiated by light in the UV spectral range. More specifically, UV-curable crosslinkers may initiate crosslinking of the layer of the sensing material when irradiated by UV light.

Suitable UV curable crosslinkers according to the present invention include: benzophenone, diazirine and azide. Particularly suitable UV-curable crosslinkers are for example selected from the group consisting of, benzophenone comprising cross-linkers, poly(Di(2-hydroxy 3 aminobenzophenonepropylene) glycol), Dibenzophenone 1,2-cyclohexanedicarboxylate, Bis[2-(4-azidosalicylamido)ethyl] Disulfide, reaction products of the reaction of 4-aminobenzophenone with any one of the above for the chemical cross-linker described di-glycidyl cross-linkers, triglycidyl cross-linkers and tetraglycidyl cross-linkers, an example of such a reaction product is 2,4,6,8-Tetramethyl-2,4,6,8-tetrakis(2-hydroxy 3-aminpropylbenzophenone)-cyclotetrasiloxan, and reaction products of the reaction of 4-Benzoylbenzoic Acid N-Succinimidyl Ester with a diamin or a jeffamin.

The analyte sensor furthermore comprises at least one second electrode which is located on the at least one second conductive material. In an embodiment, the at least one second electrode, and thus also the at least one second conductive material, is positioned on the same side of the substrate as the at least one first electrode. In another embodiment, the at least one second electrode is located on the second side of the substrate. In this embodiment it is preferred, that the at least one second electrode is positioned only on the second side of the substrate. This means, within the context of the present invention, that in an embodiment, the first side does not comprise at least one second electrode. In an embodiment, precisely one second electrode is positioned on the second side of the substrate. Preferably, the at least one second electrode does not comprise an enzyme. Thus, preferably, the at least one second electrode is free of the at least one enzyme. Preferably, the second side of the substrate is free of enzyme.

The at least one second electrode may be selected from the group consisting of a counter electrode, a reference electrode, and a combined counter/reference electrode. Preferably, the at least one second electrode is a combined counter/reference electrode.

Thus, it is preferred that the at least one second electrode of the analyte sensor is selected from the group consisting of a counter electrode, a reference electrode and a combined counter/reference electrode.

The at least one second electrode comprises silver. "Silver" within the context of the present invention does not only encompass elemental silver (Ag), but also any silver comprising compound. Therefore, the at least one second electrode comprises elemental silver and/or at least one silver comprising compound. A preferred silver comprising compound is silver chloride (AgCl). For example, the at least one second electrode comprises elemental silver and/or silver chloride. In particular, the at least one second electrode comprises elemental silver and silver chloride. In particular, the at least one second electrode comprises silver/silver chloride (Ag/AgCl). In an embodiment, the at least one second electrode only comprises AgCl when the analyte sensor is manufactured. No elemental Ag is added when the analyte sensor is manufactured. During use of the analyte sensor, elemental Ag may then be formed from AgCl, so that during use, the analyte sensor comprises Ag/AgCl. The reaction of AgCl to form elemental Ag is known to the skilled person as such.

Thus, an analyte sensor which comprises at least one second electrode which comprises Ag, AgCl or Ag/AgCl is preferred.

For example, the load of AgCl of the at least one second electrode is in the range from 20 μg to 150 μg. If two or more second electrodes are comprised, then the load of AgCl of the at least one second electrode refers to the sum of the load of AgCl of the two or more second electrodes. The load of AgCl of the at least one second electrode refers to the load when the analyte sensor is manufactured. It is clear to the skilled person that the load may change during use of the analyte sensor, for example due to the formation of elemental Ag from AgCl.

Thus, an analyte sensor in which the load of AgCl of the at least one second electrode is in the range from 20 μg to 150 μg is preferred.

The minimum load of AgCl of the at least one second electrode may be calculated according to the following formula.

$$m(\mathrm{AgCl}) = \frac{M(\mathrm{AgCl}) * I * t}{z * F}$$

wherein

I is the highest possible current in A while the analyte sensor is in use t is the total wear time of the sensor in s F is the Faraday constant in C/mol z is the charge number of silver (z=1)

M(AgCl) is the molar mass of AgCl m(AgCl) is the load of AgCl of the at least one second electrode.

Ag/AgCl which the at least one second electrode in an embodiment comprises may be comprised in a binder. Suitable binders are known as such and are, for example, selected from the group consisting of metallic binders, ceramic binders and polymeric binders. Preferred are polymeric binders, in particular physically binding polymer binders and/or chemically binding polymer binders.

For example, Ag/AgCl which the at least one second electrode comprises, comprises in the range from 50 to 70 wt.-% of Ag, in the range from 20 to 40 wt.-% of AgCl and in the range of 1 to 20 wt.-% of a binder, wherein the wt.-% are in each case based on the sum of the wt.-% of Ag, AgCl and the binder.

The at least one second electrode has a width and length. The direction of the width of the second electrode corresponds to the direction of the width of the substrate. The direction of the length of the second electrode corresponds to the direction of the length of the substrate.

The width of the at least one second electrode is preferably smaller than the width of the substrate. Thus, an analyte sensor is preferred wherein the substrate has a width and wherein the width of the at least one second electrode is smaller than the width of the substrate.

The width of the at least one second electrode may be essentially constant along its length. In this case, the projection of the at least one second electrode into the plane of the substrate may for example be in the shape of a rectangle. However, it is also possible that the width of the at least one second electrode varies along its length. In this case, the projection of the at least one second electrode into the plane of the substrate may for example be in the shape of an hour glass, a dumbbell, a butterfly or a trapezoid.

For example the at least one second electrode may have a width in the range from 300 μm to 700 μm, preferably in the range from 400 μm to 600 μm, with the proviso that the width is at most identical to the width of the substrate, preferably the width is smaller than the width of the substrate. In particular, the width of the at least one second electrode may be in the range from 50% to 90% of the width of the substrate.

In case the at least one second electrode has a width which varies along its length, the at least one second electrode may have a first width in the range from 300 μm to 700 μm and a second width in the range from 50 μm to 200 μm.

The at least one second electrode may have a length in the range from 1 mm to 5 mm, preferably in the range from 3 mm to 4 mm.

Thus at least one second electrode can have any shape, such as a rectangular shape, a trapezoidal shape, an hour glass shape and a dot shape.

It is preferred that silver which the at least one second electrode comprises is located on the at least one second conductive material. Thus, it is preferred, that Ag/AgCl is located on the at least one second conductive material, for example, on top of the layered structure of the at least one second electrically conductive material.

The silver which the at least one second electrode comprises typically forms a layer. The thickness of the layer is for example in the range from 5 μm to 30 μm.

Silver, in particular Ag/AgCl, comprised in the at least one second electrode may be applied to the at least one second conductive material of the substrate, in particular on the at least one second conductive trace, by the same methods as the methods by which the sensing material of the at least one first electrode may be applied to the at least one first conductive material of the substrate. Thus, the embodiments and preferences described above hold true. The method for applying silver, in particular Ag/AgCl, comprised in the at least one second electrode and the method for applying the sensing material comprised preferably in the at least one first electrode may be selected independent from one another.

The analyte sensor of the present invention comprises at least one protective layer covering the at least one second electrode fully. The at least one protective layer comprises a mixture of at least one biodegradable polymer and at least one non-biodegradable hydrophobic polymer. The at least one protective layer may be any layer covering the at least one second electrode. In particular, the term "protective layer" refers to a type of layer which is applied in order to control access to a further layer which is fully covered by the protective layer. As used herein, the term "fully" refers to a complete disruption of the access to the further layer. The term "cover fully" within the context of the present invention means that the at least one second electrode, when the analyte sensor is implanted into a user does not have direct contact with the body fluid of the patient, except for the region of the biodegradable polymer. Thus, in an embodiment, the at least one protective layer controls access to the at least one second electrode. The at least one protective layer may, in particular, be a membrane. In an embodiment, the term "membrane" within the context of the present invention refers to a layer of at least one material which provides a selective barrier. Thus, such a membrane generally may selectively allow for one or more molecules and/or compounds to pass through the membrane, whereas its permeability for other molecules and/or compounds is significantly reduced. For example, the membrane allows transfer of water and/or chloride anions through the membrane and restricts transfer of silver cations and/or silver chloride through the membrane.

Further the at least one protective layer may have a thickness in the range from 1 μm to 100 μm, preferably of from 2 μm to 25 μm, more preferred of from 5 μm to 20 μm.

It is preferred that the at least one first electrode does not comprise the at least one protective layer. Thus preferably the first electrode is free of the at least one protective layer. Therefore, in an embodiment an analyte sensor is preferred, wherein the protective layer does not cover the first electrode.

Thus, an analyte sensor is preferred, wherein the protective layer is not in direct contact with the first electrode.

The at least one protective layer comprises a mixture of a biodegradable polymer and a non-biodegradable hydrophobic polymer. Within the context of the present invention the term "mixture" generally refers to a combination of a biodegradable polymer and a non-biodegradable hydrophobic polymer. In general, the biodegradable polymer and the non-biodegradable hydrophobic polymer are not chemically linked to one another in the mixture. Thus, they may be separated from one another without cleaving chemical bonds between the biodegradable polymer and the non-biodegradable hydrophobic polymer. However, they may be linked by physical bonds, such as hydrogen bonds. The mixture of the biodegradable polymer and the non-biodegradable hydrophobic polymer may form a blend of the biodegradable polymer and the non-biodegradable hydrophobic polymer. In an embodiment, the non-biodegradable hydrophobic polymer may form a membrane which comprises openings as further described below. The biodegradable polymer may, in this case fill the openings. The biodegradable polymer may only fill the openings. However, it is also possible that the biodegradable polymer forms a membrane on top of the non-biodegradable hydrophobic polymer. This membrane may then, in particular fill the openings.

The protective layer comprising a mixture of a biodegradable polymer and a non-biodegradable hydrophobic polymer is in particular advantageous as the biodegradable polymer may dissolve and/or be degraded during the use of the analyte sensor, thereby granting increasing access to the second electrode for the body fluid comprising the analyte. While the biodegradable polymer dissolves and/or is degraded, it opens passages for the body fluid comprising the analyte.

The protective layer for example comprises in the range from >0 vol.-% to 50 vol.-%, such as 0.1 vol.-% to 50 vol.-%, of the biodegradable polymer and <100 vol.-% to 50 vol.-%, such as 99.9 vol.-% to 50 vol.-%, of the non-biodegradable hydrophobic polymer, in each case based on the total volume of the protective layer.

The protective layer comprises a biodegradable polymer. The term "biodegradable" within the context of the present invention in an embodiment relates to the property of a compound being degradable by a living system, in particular a subject, such as a user and/or a patient. Degradation mechanisms are known as such and are in particular selected from the group consisting of hydrolysis, oxidation, enzymatic degradation and physical degradation. Within the context of the present invention, the term "hydrolysis" refers to a reaction, i.e. degradation, of a compound, in particular of the biodegradable polymer with water, in particular with water within the body tissue. The term "oxidation" within the context of the present invention in particular refers to a reaction, i.e. degradation of a compound, in particular the biodegradable polymer with oxidants, in particular with oxidants comprised within or produced by the body tissue. The term "enzymatic degradation" in particular refers to a reaction, i.e. degradation of a compound, in particular the biodegradable polymer, with enzymes, in particular with enzymes comprised within the body tissue. The enzyme of the enzymatic degradation is preferably different from the at least one enzyme which may be comprised in the first electrode. The term "physical degradation" generally refers to degradation due to physical phenomena, such as water swelling, mechanical loading and/or wearing.

In an embodiment, degradation is accompanied by lowering the molecular mass of the compound, in particular of the biodegradable polymer.

The biodegradable polymer may have any degradation half-life. In an embodiment, the biodegradable polymer has a degradation half-life of at most 60 days, such as in the range from 0.5 to 8 weeks. Method for determining the half-life of a biodegradable polymer are known as such and are, for example disclosed for poly(D,L-lactide-co-glycolide) in Farahani et al. (2005), Iranian Polymer Journal 14 (8): 753-763. In an embodiment, said degradation half-life is determined after subcutaneous implantation of a spherical mass of 0.1 g of the compound, in an embodiment into a mouse.

The biodegradable polymer may have a water uptake of 0 to 20 wt.-%, based on the total weight of the biodegradable polymer measured at day 1 tested after ASTM D570.

Additionally or alternatively, "biodegradable" within the context of the present invention refers to a polymer which is hydrophilic, in particular, which has a water uptake in the range from 7 to 30% by weight, in an embodiment in the range from 10 to 20% by weight, based on the total weight of the polymer and measured after 24 hours according to ASTM D570.

Any known biodegradable polymer may be comprised in the protective layer. In particular, the biodegradable polymer may be selected from the group consisting of biodegradable polyanhydrides, biodegradable polyacetals, biodegradable polyorthoesters, biodegradable aliphatic polyesters, biodegradable polyurethanes, biodegradable polycarbonates, biodegradable polyamides, biodegradable poly(ether-esters) and polysaccharides.

It is clear to the skilled person that the biodegradable polyurethans differ from the thermoplastic polyurethans which in one embodiment of the present invention are used as non-biodegradable hydrophobic polymers.

Particularly preferred, the at least one biodegradable polymer comprised in the protective layer is selected from the group consisting of biodegradable polyanhydrides, biodegradable polyorthoesters, biodegradable polyacetals, biodegradable poly(ether-esters) and biodegradable aliphatic polyesters.

Thus, an analyte sensor is preferred wherein the biodegradable polymer is selected from the group consisting of biodegradable polyanhydrides, biodegradable polyorthoesters, biodegradable polyacetals, biodegradable poly(ether-esters) and biodegradable aliphatic polyesters.

Particularly preferably, the biodegradable polymer is selected from the group consisting of aliphatic polyesters. Suitable aliphatic polyesters are in particular selected from the group consisting of polyhydroxyalkanoates, poly(D,L-lactic acid), polyglycolide, and polyhydroxybutyrate.

Suitable biodegradable polyanhydrides are in particular biodegradable aliphatic polyanhdrides, such as poly(adipic acid), and/or poly(pimelic acid).

A suitable biodegradable poly(ether-ester) is for example polydioxanone.

The non-biodegradable hydrophobic polymer comprised in the protective layer will throughout the specification also be referred to as hydrophobic polymer. Thus, the terms "non-biodegradable hydrophobic polymer" and "hydrophobic polymer" are used synonymously throughout the present specification and therefore have the same meaning.

The non-biodegradable hydrophobic polymer typically cannot be degraded by a living system. In an embodiment the non-biodegradable hydrophobic polymer may be degradable by a living system. In this case, the degradation half-life of the non-biodegradable hydrophobic polymer is significantly larger than the degradation half-life of the biodegradable polymer. For example, the degradation half-life of the non-biodegradable hydrophobic polymer may be up to several years, such as for example in the range from greater 4 weeks to 1 year, in particular from greater 8 weeks to 1 year.

The hydrophobic polymer is preferably essentially impermeable. "Essentially impermeable" means that the hydrophobic polymer has a water uptake in the range from 0 to 5% by weight, in an embodiment of less than 2% by weight, based on the total weight of the at least one hydrophobic polymer, measured according to ASTM D570 after 24 hours.

"Hydrophobic" within the context of the present invention means that the polymer has a water uptake in the range from 0 to 5% by weight, in an embodiment a water uptake of less than 2% by weight, based on the total weight of the hydrophobic polymer, measured according to ASTM D570 after 24 hours.

Thus, an analyte sensor is preferred, wherein the at least one protective layer comprises at least one hydrophobic polymer which has a water uptake of less than 2% by weight based on the total weight of the at least one hydrophobic polymer.

The hydrophobic polymer is preferably a thermoplastic hydrophobic polymer.

The hydrophobic polymer, for example, has a glass transition temperature in the range from −100° C. to 100° C., preferably in the range from −70° C. to −50° C. The glass transition temperature may be measured via differential scanning calorimetry using a ramp of 10° C./min for heating and cooling. The glass transition temperature is measured during the second heating cycle. This means that first, the hydrophobic polymer is heated with a ramp of 10° C./min, then it is cooled with a ramp of 10° C./min and then it is heated again with a ramp of 10° C./min to determine the glass transition temperature.

This glass transition temperature is particularly advantageous as it results in a sufficiently high stability of the protective layer. If the sensor is bent, in particular during use, the protective layer will not or only to a small extend be damaged.

The hydrophobic polymer, for example, has a crystallization temperature in the range from 10° C. to 150° C., for example in the range from 75° C. to 85° C. The crystallization temperature is measured via differential scanning calorimetry using the same parameters as for the glass transition temperature.

The at least one hydrophobic polymer is in an embodiment selected from the group consisting of polyurethanes, polyureas, polyolefins, poly(meth)acrylates, polyesters, polyethers, polyamides, polyvinylchlorides, Fluorocarbon polymers, Polyvinylbutyral-co-vinylalcohol-co-vinylacetate and UV hardening resins. Particularly preferred are polyurethanes and/or UV hardening resins.

Thus an analyte sensor is preferred wherein the non-biodegradable hydrophobic polymer selected from the group consisting of polyurethanes, polyureas, polyolefins, poly (meth)acrylates, polyesters, polyethers, polyamides, polyvinylchlorides, Fluorocarbon polymers, Polyvinylbutyral-co-vinylalcohol-co-vinylacetate and UV hardening resins. Particularly preferred are polyurethanes and/or UV hardening resins.

Polyureas are as such known. Particularly suitable polyureas are selected from the group consisting of hydrophobic thermoplastic polyureas.

Polyolefins are as such known. Particularly suitable polyolefins are selected from the group consisting of alphatic polyolefins and aromatic polyolefins, in particular selecting from the group consisting of polyethylene, polypropylene, polybutylene and polystyrene.

Poly(meth)acrylates are as such known. The term "poly (meth)acrylates" within the context of the present invention relates to polyacrylates and to polymethacrylates. Particularly suitable polymethacrylates are for example butylmethacrylates.

Polyesters are as such known. Particularly suitable polyesters are selected from the group consisting of polyethyleneterephthalate (PET) and polycarbonates.

Polyethers are as such known. Particularly suitable polyethers are selected from the group consisting of polytetrahydrofuran (PTHF) and polyacetal, which is also known as polyoxymethylene (POM).

UV hardening resins are known as such. Particularly suitable UV hardening resins are selected from the group consisting of acrylated silicones, acrylated urethanes, acrylated epoxides and UV curing ester resins, such as acrylated polyesters.

Polyurethanes are as such known. Particularly suitable polyurethanes are selected from the group consisting of hydrophobic polyurethanes, in particular hydrophobic thermoplastic polyurethanes (TPU).

The hydrophobic thermoplastic polyurethane may comprise hard segments and soft segments in various ratios. Suitable hard segments usually comprise a polymerization product of a diisocyanate and a polyol. A suitable diisocyanate may be an aliphatic diisocyanate or an aromatic diisocyanate, preferably an aliphatic diisocyanate.

Suitable aromatic diisocyanates are for example, 4,4'-methylene diphenyl diisocyanate, and/or toluene-2,4-diisocyanate.

Suitable aliphatic diisocyanates are for example, hexamethylene diisocyanate, and/or isophorone diisocyanate.

A suitable polyol is preferably a diol, such as 1,4-butanediol, 1,5-pentanediol, 1,6-hexanediol, and/or 1,10-decanediol.

Suitable soft segments may comprise polyethers and/or polyesters. Suitable polyethers are for example polyethylene oxide and/or polytetrahydrofurane, whereas suitable polyesters are for example polyethylene terephthalate and/or polyethylene naphthalate.

In an embodiment, the at least one non-biodegradable hydrophobic polymer comprised in the at least one protective layer forms a layer, such as a membrane. Said layer preferably covers the second electrode. In this embodiment it is preferred that the layer of the at least one non-biodegradable hydrophobic polymer comprised in the protective layer comprises at least one opening. The at least one biodegradable polymer comprised in the protective layer may fill the at least one opening.

Thus, an analyte sensor is preferred, wherein the non-biodegradable hydrophobic polymer comprised in the protective layer forms a layer and said layer comprises at least one opening, wherein the biodegradable polymer comprised in the protective layer fills the opening.

The term "opening" within the context of the present invention refers to a hole, a perforation and/or a slot in the layer of the hydrophobic polymer, thereby allowing passage of one or more molecules and/or compound through the opening, in particular allowing passage of the at least one analyte, and more particular of body fluid which comprises the at least one analyte to the at least one second electrode.

The at least one opening may be distributed in an equal fashion or in an unequal fashion over the aerial expansion of a layer of the at least one non-biodegradable hydrophobic polymer. In an embodiment, the edge of the layer of the at least one hydrophobic polymer does not comprise openings. Preferably, the center region of the layer of the at least one hydrophobic polymer comprises the at least one opening.

For example, the total area of the openings comprised in the layer of the at least one hydrophobic polymer is at most 0.4 mm2 (square millimeters), particularly at most 0.2 square millimeters (mm2), preferably at most 0.1 mm2. In an embodiment, the total area of openings comprised in the layer of the non-biodegradable hydrophobic polymer is in the range from 0.005 mm2 to 0.2 mm2, preferably in the range from 0.005 mm2 to 0.1 mm2.

Thus, an analyte sensor is preferred in which the at least one opening has a total area of at most 0.4 mm2.

Within the context of the present invention, the term "total area" relates to the sum of the surface area of the openings as comprised in the layer of the non-biodegradable hydrophobic polymer.

In an embodiment, the protective layer may additionally comprise at least one pharmaceutical compound. The protective layer may in particular comprise the at least one pharmaceutical compound in the biodegradable polymer.

This is in particular advantageous as the pharmaceutical compound may be released when the biodegradable polymer is degraded. It is particularly advantageous if the protective layer additionally comprises at least one pharmaceutical compound as this pharmaceutical compound may improve tolerance of the analyte sensor in the body of a subject. Thus, in an embodiment an additional biocompatibility membrane may then be omitted.

For example, the pharmaceutical compound may be a compound improving the tolerance of an implantable element, in particular of the analyte sensor, in the body of a subject. In an embodiment, "improving tolerance" means at least one of reducing immune rejection, reducing scarring, and/or reducing growth of infectious agents. Appropriate pharmaceutical compounds for improving tolerance are, in principle known in the art. In an embodiment, the pharmaceutical compound is an immunosuppressive agent, anti-allergic agent and/or anti-inflammatory agent.

Thus, an analyte sensor is preferred, wherein the protective layer additionally comprises at least one pharmaceutical compound selected from the group consisting of an immunosuppressive agent, an anti-allergic agent and an anti-inflammatory agent.

The pharmaceutical compound may in particular be selected from the group consisting of a glucorticoid, such as cortisone and/or a derivative thereof, dexamethasone, betamethasone, a salt, derivative, and/or prodrug thereof.

The pharmaceutical compound may additionally comprise acid anhydrides as rate controlling agents for the erosion. This is for examples described in EP 0 100 424 B1, the content of which is incorporated by reference.

Betamethasone has the IUPAC-name (8S,9R,10S,11S,13S,14S,16S,17R)-9-Fluoro-11,17-dihydroxy-17-(2-hydroxyacetyl)-10,13,16-trimethyl-6,7,8,11,12,14,15,16-octahydro-cyclopenta[a]phenanthren-3-one (CAS number: 378-44-9). Dexamethasone has the IUPAC-name (8S,9R,10S,11S,13S,14S,16R,17R)-9-Fluoro-11,17-dihydroxy-17-(2-hydroxyacetyl)-10,13,16-trimethyl-6,7,8,11,12,14,15,16-octahydro-cyclopenta[a]phenanthren-3-one, (CAS number: 50-02-2).

In an embodiment, the derivative of Betamethasone or Dexamethasone is selected from the list consisting of 17-Oxo Betamethasone, Betamethasone hydrochloride, Betamethasone 21-acetate, Betamethasone 17-propionate, Betamethasone 21 propionate, Betamethasone phosphate, Betamethasone 17-valerate, Betamethasone 21-valerate, Betamethasone 17-benzoate, Betamethasone 17,21,-dipropionate, Betamethasone acibutate, Betamethasone sodium phosphate, Betamethasone butyrate propionate, Betamethasone tripropionate, 3-Hydroxy dexamethasone, 6 Hydroxy-dexamethasone, dexamethasone 17-acetate, dexamethasone 17-carboxamide, dexamethasone 17-propionate, dexamethasone 21-valerate, dexamethasone 21-acetate, dexamethasone 21-beta-D-glucoside, dexamethasone 21-linolate, dexamethasone 21-mesylate, dexamethasone 21-O-b-D-galactopyranose, dexamethasone 21-palmitate, dexamethasone 21-propionate, dexamethasone 21-sodium hydrogen phosphate, dexamethasone 21-sulfate, dexamethasone 21-tributylacetate, dexamethasone acefurate, dexamethasone 17-carboxylic acid, dexamethasone beta-D-glucuronide, dexamethasone dipropionate, Dexamethasone hemisuccinate, dexamethasone laurate, dexamethasone phosphate, dexamethasone sodium phosphate, dexamethasone tridecylate, dexamethasone valerate, dexamethasone 21-isonicotinate; in an embodiment is selected from the list consisting of Betamethasone 21-acetate, Betamethasone 17-propionate, Betamethasone 21 propionate, Betamethasone 17-valerate, Betamethasone 21-valerate, Betamethasone butyrate propionate, Betamethasone tripropionate, dexamethasone 17-acetate, dexamethasone 17-carboxamide, dexamethasone 17-propionate, dexamethasone 21-valerate, dexamethasone 21-acetate, dexamethasone 21-linolate, dexamethasone 21-mesylate, dexamethasone 21-palmitate, dexamethasone 21-propionate, dexamethasone 21-tributylacetate, dexamethasone acefurate, dexamethasone dipropionate, dexamethasone laurate, dexamethasone tridecylate, dexamethasone valerate.

The analyte sensor may comprise at least one third electrode. In an embodiment, the analyte sensor does not comprise at least one third electrode.

If at least one third electrode is comprised in the analyte sensor, then the at least one second electrode is preferably selected from the group consisting of a counter electrode and a reference electrode. The at least one third electrode is then preferably also selected from the group consisting of a counter electrode and a reference electrode. If the at least one second electrode is a counter electrode, then the at least one third electrode is a reference electrode and vice versa.

In case the analyte sensor comprises at least one third electrode it is preferred that the at least one second electrode is a reference electrode and that the third electrode is a counter electrode. In this embodiment it is further preferred that the first electrode and the second electrode as well as the first conductive material and the second conductive material are positioned on a first side of the substrate whereas the third electrode is positioned on a second side of the substrate.

The analyte sensor may further comprise at least one flux limiting membrane.

The at least one flux limiting membrane is specifically at least positioned on top of the at least one first electrode. Preferably, the at least one flux limiting membrane is also positioned on top of the protective layer.

The term "flux limiting membrane", as used herein, is a broad term and is to be given its ordinary and customary meaning to a person of ordinary skill in the art and is not to be limited to a special or customized meaning. The term specifically may refer, without limitation, to a layer of at least one material, which provides a selective barrier. Thus, the flux limiting membrane generally may selectively allow for one or more molecules and/or compounds to pass, whereas other molecules and/or compounds are stopped by the flux limiting membrane. Thus, the flux limiting membrane is permeable for the at least one analyte to be detected. Thus, as an example, the flux limiting membrane may be permeable for one or more of glucose, lactate, cholesterol or other types of analytes. The at least one flux limiting membrane may, hence, function as a diffusion barrier that controls diffusion of the analyte from the exterior, e.g. the body fluid surrounding the analyte sensor, to the first electrode, preferably to the sensing material, i.e. the at least one enzyme which may be comprised in the first electrode. In addition, the at least one flux limiting membrane may function as a biocompatibility membrane layer as mentioned elsewhere herein.

The at least one flux limiting membrane, as an example, may have a thickness sufficient for providing mechanical stability. The at least one flux limiting membrane specifically may have a thickness of 1 μm to 150 μm. For the at least one flux limiting membrane, as outlined herein, several materials may be used, standalone or in combination. Thus, as an example, the flux limiting membrane specifically may comprise at least one polymeric material. Suitable polymeric materials may, for example be selected from the group consisting of a polyvinylpyridine based copolymer, a polyurethane and a hydrogel. Polyvinylpyridine based copolymers are particularly suitable.

Suitable hydrogels are in particular polyethylene glycol copolymers (PEG copolymers), polyvinyl acetate copolymers (PVA copolymers), poly(2-alkyl-2-oxazonline) copolymers, polyacrylate and/or methacrylate-acrylate copolymers or block-copolymers, in particular polyacrylate and/or methacrylate-acrylate copolymers or block-copolymers comprising hydrophilic side groups. Thus, as an example, suitable hydrogels may be selected from the group consisting of (hydroxyethyl)methacrylate (HEMA)-homopolymers, HEMA-copolymers, silicon hydrogels and HEMA-co-N-vinylpyrrolidone-polymers, each of which may comprise side groups selected from the group consisting of methacrylic acid, glycerol methacrylate, N,N-dimethylacrylamide and phospharylcholine.

These types of flux limiting membranes are generally known in the art. As an example, flux limiting membranes as disclosed in e.g. EP2697388 A1, WO 2007/071562 A1 and/or in WO 2005/078424 A1 may be used. Specifically, the polymeric material may have a weight average molecular weight (MW) of more than 10.000 kDa. More specifically, the polymeric material may have a weight average molecular weight (MW) of more than 50.000 kDa, or even more than 100.000 kDa. Particularly suitable are polymeric materials with a weight average molecular weight (MW) of 10.000 to 500.000 kDa. The polymeric material of the flux limiting membrane may be the same as or may be different from the polymeric material of the sensing material.

The analyte sensor may further comprise at least one biocompatibility membrane.

The at least one biocompatibility membrane is specifically at least positioned on top of the at least one first electrode. Preferably, the at least one biocompatibility membrane is also positioned on top of the protective layer. In particular, the at least one biocompatibility membrane is positioned on top of the flux limiting membrane which is in an embodiment of the present invention comprised in the analyte sensor. Specifically, the biocompatibility membrane fully covers the at least one flux limiting membrane. The term "fully covers" within the context of the present invention means that, specifically, the flux limiting membrane is not in direct contact with a body fluid if the analyte sensor is in use, but only the biocompatibility membrane is in direct contact with the body fluid. This means that at least the insertable portion of the analyte sensor is preferably fully covered by the at least one biocompatibility membrane.

The term "biocompatibility membrane", also denoted biocompatibility layer, as used herein, relates to a layer, in particular an outmost layer of the analyte sensor or part thereof, consisting of a biocompatible material. Specifically, the biocompatibility layer has a thickness of from 1 μm to 10 μm, in an embodiment of from 3 μm to 6 μm. More specifically, the biocompatibility layer covers the analyte sensor at least partly or completely. Even more specifically, the biocompatibility layer may be the outmost layer of the analyte sensor. Thus, even more specifically, at least a part of the biocompatibility layer contacts a body fluid of a subject. For example, the biocompatibility layer may be not diffusion-limiting for the analyte as specified elsewhere herein. For example, the biocompatibility layer may be not diffusion-limiting for small molecules having a molecular weight of less than 2.000 Da, in an embodiment less than 1.000 Da. For example, the biocompatibility layer may not comprise an added enzyme. For example, the biocompatibility layer may not comprise an added polypeptide. As will be understood by the skilled person, this does not exclude that enzyme or polypeptide molecules diffuse into the biocompatibility layer from adjacent layers, tissues, or body fluids.

The term "biocompatible material", as used herein relates to a material suitable for use with living tissue or a living system by not being or being to a reduced extent toxic, injurious, or physiologically reactive and/or causing to a reduced extent or not causing immunological rejection. In an embodiment, the biocompatible material is a material not inducing a bodily response, e.g. an inert material or a material comprising chemical compounds preventing bodily responses from occurring in the vicinity of the biocompatibility layer. In another embodiment, the biocompatible material is a material pre-venting cells from attaching to said biocompatibility layer. The biocompatibility membrane may be or may comprise at least one material selected from the group consisting of methacrylate based polymers and copolymers, such as acrylamide-methacrylate based copolymers, biodegradable polysaccharides such as hyaluronic acid (HA), agarose, dextran and chitosan. Further biocompatible materials are disclosed in WO 2019/166394 A1 and include nonbiodegradable synthetic hydrogels such as hydrogels prepared from the copolymerization of 2-hydroxyethyl methacrylate (HEMA), 2-hydroxypropyl methacrylate (HPMA), acrylamide (AAm), acrylic acid (AAc), N-isopropylacrylamide (NIPAm), and methoxyl poly(ethylene glycol) (PEG) monoacrylate (mPEGMA or PEGMA), with cross-linkers, such as N,N'-methylenebis(acrylamide) (MBA), ethylene glycol diacrylate (EGDA) and PEG diacrylate (PEGDA), Pluronic® polymers with a structure of poly(ethylene oxide) (PEO)-poly(propylene oxide) (PPO)-PEO, chemical cross-linking of modified poly(vinyl alcohol) (PVA), Poly (4vinylpyridine), PEG.

Another object of the present invention is a method for producing an analyte sensor, in particular the inventive analyte sensor, the method comprising the steps:

a) providing a raw substrate, the raw substrate comprising at least one first conductive material and at least one second conductive material,
b) preparing at least one first electrode on the at least one first conductive material,
c) applying a silver comprising layer in a manner that in partially covers the at least one second conductive material to obtain at least one second electrode,
d) applying at least one protective layer in a manner that it fully covers the silver comprising layer applied in step c),
e) cutting the raw substrate to obtain the analyte sensor.

Process steps a) to e) may be carried out in the given order. However, it is also possible to carry out the steps in different orders. In particular, the order of step b) and c) may be different. Further process steps are feasible. It is also possible to carry out at least one of process steps a) to e) more than once. For example, step d) and/or step e) may be carried out more than once so that more than one layer of the protective layer is applied and/or the raw substrate is cut more than once.

In step a) of the method for manufacturing an analyte sensor, a raw substrate is provided.

Within the context of the present invention, the term "raw substrate" specifically may refer, without limitation, to any kind of material or combination of materials which is suitable to form a carrier layer to support the at least one first electrode and the at least one second electrode. From the raw substrate, the substrate of the inventive analyte sensor is manufactured by cutting the raw substrate. In particular, the raw substrate may comprise an electrically insulating material. For the electrically insulating material, the embodiments and preferences described above for the electrically insulating material of the substrate hold true.

Thus in a preferred embodiment the raw substrate comprises at least one electrically insulating material selected from the group consisting of an insulating epoxy resin, a polycarbonate, a polyester, a polyvinylchloride, a polyurethane, a polyether, a polyethylene, a polyamide, a polyimide, a polyacrylate, a polymethacrylate, a polytetrafluoroethylene or a copolymer thereof, and alumina.

A suitable polyester is for example polyethyleneterephthalate.

However, a length and a width of the raw substrate may, in general, considerably differ from the length and the width of the substrate as comprised by the analyte sensor. The length and the width of the raw substrate within the context of the present invention are defined with reference to the width and the length of the substrate of the analyte sensor. Thus, the direction of the length of the raw substrate within the context of the present invention corresponds to the direction of the length of the substrate of the analyte sensor which is cut from the raw substrate. Correspondingly, the direction of the width of the raw substrate within the context of the present invention corresponds to the direction of the width of the substrate of the analyte sensor which is cut from the raw substrate.

Preferably, the raw substrate may have a width of 1 cm to 1 km, more preferred of 10 cm to 100 m, and a length of 1 cm to 10 cm, more preferred of 2 cm to 8 cm. In a preferred embodiment, the raw substrate can be provided as a roll, in particular designated for being used in a roll-to-roll process.

The raw substrate comprises at least one first conductive material and at least one second conductive material. For the at least one first conductive material and the at least one second conductive material the embodiments and preferences as described above for the first conductive material and the second conductive material of the analyte sensor apply.

Providing the raw substrate in step a) may comprise the following steps:

a1) providing a raw substrate, a2) applying at least one first conductive material to the raw substrate, preferably to a first side of the raw substrate, a3) applying at least one second conductive material to the raw substrate, preferably to a second side of the raw substrate, a4) obtaining the raw substrate which comprises at least one first conductive material and at least one second conductive material.

The first conductive material can be applied to the raw substrate in step a2) by any known method, for example via chemical vapor deposition (CVD), physical vapor deposition (PVD), or a wet-coating process. Wet-coating processes are known as such. A suitable wet-coating process is for example selected from the group consisting of spin-coating, spray-coating, doctor-blading, printing, dispensing, slot-coating, dip coating and screen printing.

The second conductive material can be applied to the raw substrate in step a3) by any known method, for example via chemical vapor deposition (CVD), physical vapor deposition (PVD), or a wet-coating process. Wet-coating processes are known as such. A suitable wet-coating process is for example selected from the group consisting of spin-coating, spray-coating, doctor-blading, printing, dispensing, slot-coating, dip coating and screen printing.

The raw substrate may comprise a first side and a second side. To the person skilled in the art it is clear that the first side and the second side are different from one another.

In an embodiment the first side and the second side are positioned opposite each other. Therefore, in an embodiment the raw substrate comprises two opposing sides, the first side and the second side opposing the first side.

The raw substrate may be a flat substrate. Specifically the raw substrate may be flexible and/or deformable. Thus, as an example, the raw substrate may be a thin, flexible raw substrate. As an example, the raw substrate may have a thickness of 50 μm to 1 mm, specifically a thickness of 80 μm to 500 μm, such as 110 μm to 250 μm.

The raw substrate may be provided by any method known to the skilled person. For example, the raw substrate may be provided as a roll. This is particularly advantageous as the raw substrate may then be used in a roll-to-roll process.

In an embodiment, the raw substrate is cut into sheets before the first electrode is prepared. The sheets may have any width, such as, for example, in the range from 100 mm to 300 mm.

In step b) the at least one first electrode is prepared on the at least one first conductive material. For the at least one first electrode the embodiments and preferences described above apply. Thus, the at least one first electrode is preferably at least one working electrode.

Preferably, step b) comprises the following steps:

b1) applying at least one layer of a sensing material in a manner that it partially covers the at least one first conductive material to obtain the at least one first electrode, b2) optionally applying at least one layer of a flux limiting membrane polymer in a manner that it fully covers the at least one first electrode.

Thus, preferred is also a method for producing an analyte sensor, wherein step b) comprises the steps:

b1) applying at least one layer of a sensing material in a manner that it partially covers the at least one first conductive material to obtain the at least one first electrode, b2) optionally applying at least one layer of a flux limiting membrane polymer in a manner that it fully covers the at least one first electrode.

For the sensing material applied in step b1) the embodiments and preferences as described above apply.

The sensing material may be applied by any known method to the at least one first conductive material, for example by a wet-coating process. A suitable wet-coating process is for example selected from the group consisting of spin-coating, spray-coating, doctor-blading, printing, dispensing, slot-coating, dip coating and screen printing. After the wet-coating process, the layer of the sensing material may be further treated. Such treatments are for example drying treatments, curing treatments and/or laser ablation treatments. Such treatments are known as such.

The first electrode, in particular the sensing material, is applied to the first conductive material so that it partially covers the first conductive material, it may also overlap with the first conductive material. The sensing material may be applied to the first conductive material in any shape. For example in the shape of one or a plurality of lines, one or a plurality of dots, one or a plurality of strips. It is also possible to remove the sensing material partially from the at least one first conductive material after its application. Methods to remove the sensing material partially from the at least one first conductive material are known as such. For example, a portion of the sensing material may be irradiated by light, in particular by a laser, thereby removing the sensing material partially. It is also possible to irradiate a portion of the sensing material, thereby crosslinking the sensing material and afterwards washing the non-irradiated portion away.

The at least one layer of a flux limiting membrane polymer may be applied by any known method to the at least one first electrode, for example by a wet-coating process. A suitable wet-coating process is for example selected from the group consisting of spin-coating, spray-coating, doctor-blading, printing, dispensing, slot-coating, dip coating and screen printing. After the wet-coating process, the layer of the flux limiting membrane polymer may be further treated. Such treatments are for example drying treatments, curing treatments and/or laser ablation treatments. Such treatments are known as such.

If the at least one flux limiting membrane polymer is applied, then it is typically applied in a manner that it fully covers the at least one first electrode. This means that typically the first electrode does not have direct contact with the body fluid when the analyte sensor is in use but that the contact with the body fluid is only via the flux limiting membrane.

In step c) a silver comprising layer is applied in a manner that it partially covers the at least one second conductive material to obtain at least one second electrode.

The second electrode obtained in step c) specifically comprises all components which form part of the at least one second electrode of the analyte sensor.

For the at least one second electrode obtained in the inventive method the preferences and embodiments as described above for the at least one second electrode of the analyte sensor apply.

The silver comprising layer is typically applied in the form of a silver composition. The silver composition may be any composition known to the skilled person. In particular, the silver composition comprises silver. "Silver" within the context of the silver composition of the present invention not only encompasses elemental silver but also silver compounds. In particular, the silver composition comprises Ag/AgCl and a polymer binder. For the polymer binder and for Ag/AgCl the preferences and embodiments described above hold true.

The silver comprising layer may be applied to the second conductive material by any method known, for example by a wet-coating process. A suitable wet-coating process is for example selected from the group consisting of spin-coating, spray-coating, doctor-blading, printing, dispensing, slot-coating, dip coating and screen printing. After the wet-coating process, the silver comprising layer may be further treated. Such treatments are for example drying treatments, curing treatments and/or laser ablation treatments. Such treatments are known as such.

The silver comprising layer is applied to the second conductive material so that it partially covers the second conductive material, it may also overlap with the second conductive material. The silver comprising layer may be applied to the second conductive material in any shape. For example in the shape of one or a plurality of lines, one or a plurality of dots, one or a plurality of strips and/or in the shape of one or a plurality of hour glass shapes. It is also possible to remove the silver comprising layer partially from the at least one second conductive material after its application. Methods to remove the silver comprising layer partially from the at least one second conductive material are known as such. For example, a portion of the silver comprising layer may be irradiated by light, in particular by a laser, thereby removing the sensing material partially. It is also possible to irradiate a portion of the silver comprising layer, thereby crosslinking the silver comprising layer and afterwards washing the non-irradiated portion away.

Particularly preferred, in step c) the silver comprising layer is applied in the form of multiple fields onto the at least one second conductive material. Preferably, the multiple fields are separated from one another, wherein each of the multiple fields has a width and a length. For the width and the length of the multiple fields the embodiments and preferences as described above for the width and the length of the at least one second electrode apply. It is to be understood that the multiple fields having a width and a length may also be obtained by partial removal of the silver comprising layer after its application.

Thus, a method for manufacturing an analyte sensor is preferred, wherein in step c) the silver comprising layer is applied in the form of multiple fields onto the at least one second conductive material, preferably, the multiple fields are separated from one another, wherein each of the multiple field has a width and a length.

The term "separated from one another" within the context of the present invention means that the multiple fields do not have direct contact with one another. Thus, the multiple fields preferably do not touch one another. However, the multiple fields may be in contact, in particular in electrical contact, with one another for example via the at least one second conductive material.

In step d) at least one protective layer is applied in a manner that it fully covers the silver comprising layer applied in step c). For the at least one protective layer applied in the method, the embodiments and preferences described for the protective layer of the analyte sensor apply. Thus, the at least one protective layer comprises a mixture of at least one biodegradable polymer and at least one non-biodegradable hydrophobic polymer.

Typically, the at least one protective layer is not applied to the at least one first electrode.

The at least one protective layer may be applied to the silver comprising layer by any method known, for example by a wet-coating process. A suitable wet-coating process is for example selected from the group consisting of spin-coating, spray-coating, doctor-blading, printing, dispensing, slot-coating, dip coating and screen printing. After the wet-coating process, the layer of the protective layer may be further treated. Such treatments are for example drying treatments, curing treatments and/or laser ablation treatments. Such treatments are known as such.

Typically the at least one protective layer has a length and a width. In a preferred embodiment, the length of the at least one protective layer is larger than the length of the multiple fields of the silver comprising layer.

Thus a method is preferred wherein the at least one protective layer has a length which is larger than the length of each of the multiple fields of the silver comprising layer.

The protective layer may be applied in as one broad line having a length which is larger than the length of each of the multiple fields of the silver comprising layer. However, it is also possible that the protective layer is applied in the form of multiple fields. In this case the protective layer preferably has a width which is larger than the width of the at least one second electrode and a length which is larger than the length of the at least one second electrode.

In connection with the method for producing an analyte sensor the terms "width" and "length" are defined corresponding to the analyte sensor to be manufactured. Thus, the length is measured in the direction of the length of the analyte sensor to be manufactured and the width is measured perpendicular thereto.

Step d), applying the at least one protective layer, may comprise the following steps:

d1) applying a non-biodegradable hydrophobic polymer in a manner that it fully covers the silver comprising layer, d2) irradiating the non-biodegradable hydrophobic polymer applied in step d1) with at least one laser beam to form at least one opening so that the opening is designed to provide access to the at least one second electrode for the at least one analyte, d3) applying the biodegradable polymer in a manner that it fills the openings formed in step d2).

Thus a method for producing an analyte sensor is preferred, wherein step d) comprises the steps:

d1) applying a non-biodegradable hydrophobic polymer in a manner that it fully covers the silver comprising layer, d2) irradiating the non-biodegradable hydrophobic polymer applied in step d1) with at least one laser beam to form at least one opening so that the opening is designed to provide access to the at least one second electrode for the at least one analyte, d3) applying the biodegradable polymer in a manner that it fills the openings formed in step d2).

The non-biodegradable hydrophobic polymer is in particular applied in step d1) in the form of a layer. It may be applied to the silver comprising layer by any method known, for example by a wet-coating process. A suitable wet-coating process is for example selected from the group consisting of spin-coating, spray-coating, doctor-blading, printing, dispensing, slot-coating, dip coating and screen printing. After the wet-coating process, the layer of the hydrophobic polymer may be further treated. Such treatments are for example drying treatments, curing treatments and/or laser ablation treatments. Such treatments are known as such.

In step d2) the non-biodegradable hydrophobic polymer, in particular the layer of the non-biodegradable hydrophobic polymer, is irradiated with at least one laser beam to form at least one opening so that the opening is designed to provide access to the at least one second electrode for the at least one analyte. For the at least one opening formed in step d2) the embodiments and preferences described above for the at least one opening of the analyte sensor apply.

The at least one laser beam may irradiate the at least one hydrophobic polymer continuously so that the at least one opening may form as a slot. However, it is also possible that the at least one laser beam irradiates the at least one hydrophobic polymer in a semi-continuous manner so that, for example, individual holes are formed. It is in particular preferred that, if the at least one second electrode is applied in the form of multiple fields in step c) the openings are formed in a manner that they provide access to each of the multiple fields. Thus, the at least one opening is formed in a manner that access to each of the at least one second electrodes is provided.

In step d3) the biodegradable polymer is applied in a manner that it fills the openings formed in step d2). The biodegradable polymer is in particular applied in step d3) in the form of a layer, in particular on top of the layer of the non-biodegradable polymer, thereby filling the openings. It may be applied by any method known, for example by a wet-coating process. A suitable wet-coating process is for example selected from the group consisting of spin-coating, spray-coating, doctor-blading, printing, dispensing, slot-coating, dip coating and screen printing. After the wet-coating process, the layer of the biodegradable polymer may be further treated. Such treatments are for example drying treatments, curing treatments and/or laser ablation treatments. Such treatments are known as such.

In step e) the raw substrate is cut to obtain the analyte sensor. The raw substrate is preferably cut along its length so that strips are formed. These strips may correspond to the analyte sensor. It is possible that before or after the raw substrate is cut along its length it is cut at least once along its width.

If the at least one second electrode is applied as multiple fields, then the raw substrate is preferably cut between at least two of the multiple fields. Thus, it is preferred that the second electrode is not cut.

Thus, a method for producing an analyte sensor is preferred, wherein in step e) the raw substrate is cut between two of the multiple fields of the silver comprising layer The raw substrate may be cut by any method known to the skilled person. For example, it may be cut by mechanical methods such as by a knife and/or a saw. It is also possible to cut the raw substrate with a laser beam. This embodiment is preferred.

Thus a method for producing an analyte sensor is preferred, wherein in step e) the raw substrate is cut using a laser beam.

Preferably, in step e) no openings are formed. Thus, preferably the cutting of the raw substrate does not result in openings in the protective layer, in particular, no openings are obtained in the cutting region. However, it is possible that the openings are formed in the same process step in which also the cutting of the raw substrate is performed. In this case, preferably no openings are obtained in the cutting region.

Further process steps may be carried out. For example, in a step f) a flux limiting membrane may be applied.

Thus, in an embodiment of the inventive method the following step f) is carried out: f) applying a flux limiting membrane to the analyte sensor obtained in step e) to obtain a covered analyte sensor.

For the flux limiting membrane, the preferences and embodiments described above hold true. In particular, the flux limiting membrane, preferably the at least one polymeric material comprised in the flux limiting membrane, may for example be applied by a wet-coating process. A suitable wet-coating process is for example selected from the group consisting of spin-coating, spray-coating, doctor-blading, printing, dispensing, slot-coating, dip coating and screen printing.

For example, in a step g) a biocompatibility membrane may be applied.

Thus, in an embodiment of the inventive method, the following step g) is carried out: g) applying a biocompatibility membrane to the analyte sensor obtained in step e).

If step f) is carried out, then the biocompatibility membrane is typically applied to the covered analyte sensor obtained in step f)

Thus, in case step f) is carried out, in an embodiment the following step g) is carried out:

g) applying a biocompatibility membrane to the covered analyte sensor obtained in step f).

For the biocompatibility membrane, the preferences and embodiments described above hold true. In particular, the biocompatibility membrane usually consists of a biocompatible material. Thus, preferably, in step g) a biocompatible material is applied. The biocompatibility membrane, preferably the biocompatible material may be applied by any process known, in particular by a wet-coating process. A suitable wet-coating process is for example selected from the group consisting of spin-coating, spray-coating, doctor-blading, printing, dispensing, slot-coating, dip coating and screen printing.

Another object of the present invention is, therefore, also an analyte sensor obtainable by the inventive method for manufacturing an analyte sensor.

In an embodiment, the following additional step h) may be carried out:

h) electronically connecting the analyte sensor with an electronics unit to obtain an analyte sensor system comprising the analyte sensor and the electronics unit.

A further object of the present invention is an analyte sensor system comprising:

the inventive analyte sensor and an electronics unit, the electronics unit being in electronically connected to the analyte sensor.

For the analyte sensor comprised in the analyte sensor system, the embodiments and preferences described above for the inventive analyte sensor hold true.

The term "electronics unit" as used herein is a broad term and is to be given its ordinary and customary meaning to a person of ordinary skill in the art and is not to be limited to a special or customized meaning. The term specifically may refer, without limitation, to a unit, such as a unit which may be handled as a single piece, which is configured for performing at least one electronic function. Specifically, the electronics unit may have at least one interface for being connected to the analyte sensor, wherein the electronics unit may provide at least one electronic function interacting with the analyte sensor, such as at least one measurement function. The electronics unit specifically may be configured for measuring at least one voltage and/or for measuring at least one current, thereby interacting with the analyte sensor. The electronics unit may further comprise at least one integrated circuit, such as a processor and/or a battery. The term "processor" as generally used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing an electronic signal, such as a current or a voltage, specifically an electronic signal from the analyte sensor. Specifically, the processor may be or may comprise a microcontroller unit (MCU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) or the like. The processor specifically may be configured, such as by software programming, for performing one or more evaluation operations. Thus, the processor may be configured for processing and/or evaluating the electronic signal from the analyte sensor and, for example, outputting a signal indicating the analyte concentration measured by the analyte sensor. The electronics unit further may comprise at least one measuring device for measuring at least one of a voltage and a current, such as a potentiostat. Further, the electronics unit may comprise a microcontroller, specifically being configured for controlling one or more electronic functions of the electronics unit.

The electronics unit specifically may comprise at least one electronics unit housing, wherein the analyte sensor, e.g. with a proximal end and/or an end providing electrical contacts for contacting the analyte sensor, may protrude into the electronics unit housing and may be electrically connected with at least one electronic component within the electronics unit housing. As an example, the proximal end and/or at least one contact portion of the analyte sensor may protrude into the electronics unit housing and, therein, may be electrically connected to at least one electronic component, such as to at least one printed circuit board and/or at least one contact portion of the electronics unit, e.g. by one or more of a soldering connection, a bonding connection, a plug, a clamping connection or the like. The electronics unit specifically may be used and/or configured as a transmitter for transmitting measurement data to at least one external device, such as to at least one receiver, e.g. wirelessly.

The electronics unit is electronically connected to the analyte sensor. Thus, an electrical connection exits between the analyte sensor and the electronics unit. The electronics unit comprised in the analyte sensor system is in contact with the analyte sensor. For example, the first conductive material and the second conductive material of the analyte sensor may each form an electrical connection with the electronics unit. Typically, the analyte sensor comprises the contact portion at a proximal end and the first electrode and the second electrode at a distal end. Thus, an electrical signal, such as an electrical current and/or an electric voltage, may be transmitted via the electronic connection from the analyte sensor to the electronics unit. Via the electrical connection, the electronics unit may interact with the analyte sensor for performing at least one electrochemical measurement. The electrical connection specifically, as outlined above, may be established by at least one connection portion of the analyte sensor protruding into a housing of the electronics unit.

SHORT DESCRIPTION OF THE FIGURES

Further details of the invention can be derived from the following disclosure of preferred embodiments. The features of the embodiments can be implemented in an isolated way or in any combination. The invention is not restricted to the embodiments. The embodiments are schematically depicted in the Figures. The Figures are not to scale. Identical reference numbers in the Figures refer to identical elements or functionally identical elements or elements corresponding to each other with regard to their functions.

Figure 2:
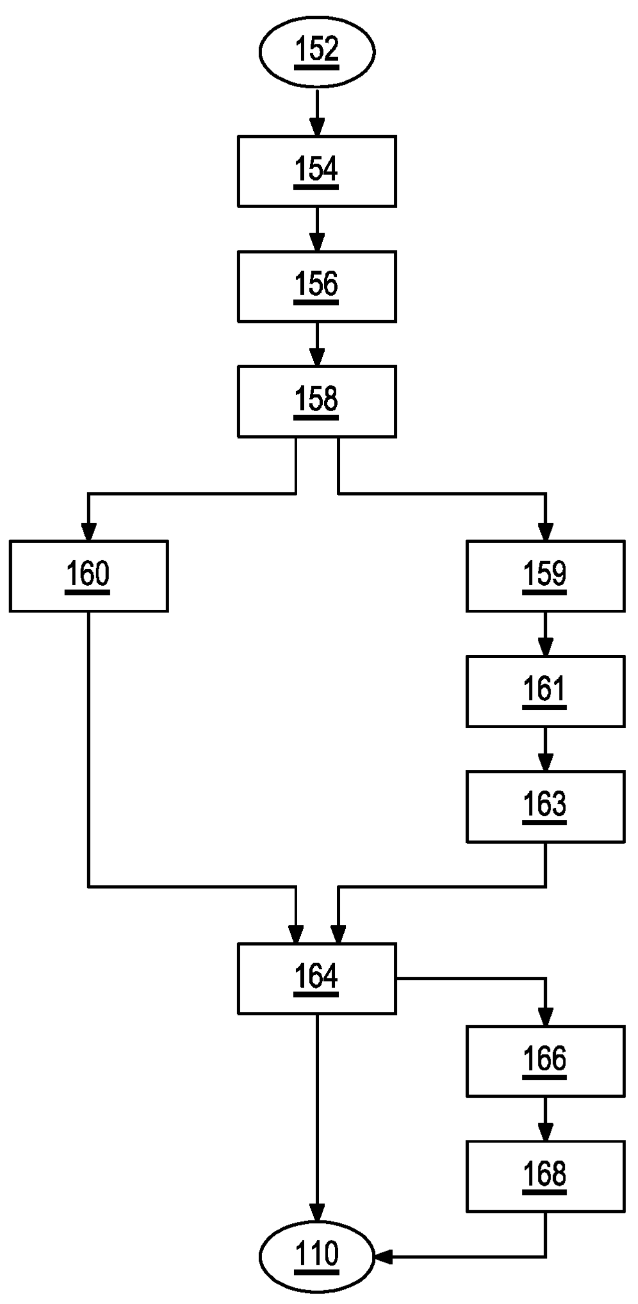

In the figures:

FIG. 1: schematically illustrates an aerial view of an embodiment of an analyte sensor according to the present invention;

FIG. 2: schematically illustrates a method for producing an analyte sensor according to the present invention FIGS. 3*a* to 3*e*: schematically illustrate selected steps for producing an analyte sensor according to an embodiment of the present invention.

DETAILED DESCRIPTION OF THE EMBODIMENTS

In the Figures, identical reference numbers depict identical features.

FIG. 1 schematically illustrates an aerial view of the insertable part of an analyte sensor 110 according to the present invention. Thus, the Figure shows the distal end of the analyte sensor. The proximal end of the analyte sensor is not shown. The Figure does not show the parts of the analyte sensor which remain outside of the body of a user. The waved lines indicate where the part of the analyte sensor which is not shown is located. It is particularly emphasized that the dimensions as used in FIG. 1 are not to scale.

The analyte sensor 110 depicted in FIG. 1 may in particular be a flat sensor that can be partially implantable for continuously monitoring the analyte, in particular by performing a continuous measurement of one or more analytes in a subcutaneous tissue, preferably in a body fluid, especially in an interstitial fluid or in blood. For this purpose, the analyte sensor 110 may be configured to convert the one or more analytes into an electrically charged entity by using an enzyme. Specifically, the one or more analytes may comprise glucose which may be converted into an electrically charged entity by using at least one enzyme selected from the group consisting of glucose oxidase (GOD) and glucose dehydrogenase (GDH). However, the analyte sensor 110 may also be applicable to other analytes and/or to other processes for monitoring an analyte.

As illustrated in FIG. 1, the analyte sensor 110 comprises an electrically insulating substrate 112. The substrate 112 may in particular be an elongated planar substrate 112 having a strip or a bar shape which may, preferably, be flexible and/or deformable and/or bendable, and is designated for carrying the layers as described below. Using the planar substrate 112 may, in particular, facilitate providing a flat analyte sensor 110. The substrate 112 may comprise at least one electrically insulating material preferably selected from the group as indicated above, especially in order to avoid unwanted currents between electrically conducting elements carried by the substrate 112, in particular to avoid unwanted currents between the first conductive material 122 and the second conductive material 124.

As further depicted in FIG. 1, the planar substrate 112 has a first side 114 and a second side 116, wherein the first side 114 and the second side 116 are positioned opposite to each other. In the exemplary embodiment of the analyte sensor 110 shown in FIG. 1, a first electrode 118, in particular a working electrode, is located on the first conductive material 122 and on the first side 114 of the substrate 112. The second electrode 120, which comprises silver is located on the second conductive material 124 and on the second side 116 of the substrate 112. The second conductive material 124 further comprises a layer of solder resist 132. Also the first conductive material 122 may comprise a layer of solder resist (not shown in FIG. 1). This is generally known.

The second electrode 120 may, preferably, be a counter electrode, a reference electrode and/or a combined counter/reference electrode. Particularly preferred, the second electrode 120 may be or comprise a single combined counter/reference electrode, such that the analyte sensor 110 could be considerably small to be used as implantable sensor 110. As shown in FIG. 1, the second electrode has a rectangular shape. However, other shapes are feasible.

The first conductive material 122 and the second conductive material 124 preferably comprise an electrically conductive material, preferably selected from a noble metal, especially gold, or, as particularly preferred, from an electrically conductive carbon material; however, further kinds of electrically conductive materials may also be feasible. As an alternative, the first conductive material 122 and/or the second conductive material 124 may comprise a layered structure such as described above in more detail.

As further illustrated in FIG. 1, the second electrode 120 comprises silver, in particular a silver comprising layer 126. As already described above, the second electrode 120 may, preferably, comprise Ag/AgCl. FIG. 1 further depicts that a protective layer 148 covers the second electrode 120. The protective layer 148 comprises a mixture of a non-biodegradable hydrophobic polymer 128 and a biodegradable polymer 130. In the embodiment depicted in FIG. 1, the non-biodegradable hydrophobic polymer 128 is a layer of the non-biodegradable hydrophobic polymer 128. This layer comprises openings 136. The openings 136 are in the shape of holes. The biodegradable polymer 130 fills the openings 136. Thus, the layer of the non-biodegradable hydrophobic polymer 128 comprising openings 136 together with the biodegradable polymer 130 filling the openings 136 form the protective layer 148.

The protective layer 148 has a width 142 which is preferably larger than the width 138 of the second electrode 120 and the protective layer 148 has a length 144 which is preferably larger than the length 140 of the second electrode 120. The protective layer 148 preferably has the same width 142 as the width 134 of the substrate 112.

FIG. 2 schematically illustrates a method for producing an analyte sensor 110 according to the present invention.

A raw substrate 152 is provided in a providing step 154 according to step a). As already indicated above, the raw substrate 152 comprises the same insulating material and has the same thickness as the substrate 112 but differs from the substrate in a length and/or a width. The individual analyte sensors 110 each comprising the substrate 112 may be isolated from the raw substrate 152 by using a cutting process as described above in more detail. For ease of processing, the raw substrate 152 may be designated for being used in a roll-to-roll process and may, in particular, be provided as a roll. The raw substrate 152 may in particular comprise the first conductive material 122 and the second conductive material 124.

In preparing step 156, the first electrode 118 is prepared on the first conductive material 122 according to step b) of the inventive method.

The silver comprising layer 126 is applied in applying step 158 according to step c) in a manner that is partially covers the second conductive material 124 to obtain the second electrode 120.

In a second applying step 160 according to step d) of the inventive process, the protective layer 128 is applied in a manner that it fully covers the silver comprising layer 126.

In an embodiment of the invention the second applying step 160 comprises steps 159, 161, and 163 as shown in FIG. 2.

In hydrophobic polymer applying step 159 according to step d1) of an embodiment of the inventive method, the non-biodegradable hydrophobic polymer 128 is applied, in particular in the form of a layer, in a manner that it fully covers the silver comprising layer 126.

In irradiation step 161 according to step d2) of an embodiment of the inventive method, the non-biodegradable hydrophobic polymer 128, in particular the layer of the non-biodegradable hydrophobic polymer 128 is irradiated with a laser beam to form openings 136.

In biodegradable polymer applying step 163 according to step d3) of an embodiment of the inventive method, the biodegradable polymer 130 is applied, in particular to the non-biodegradable hydrophobic polymer 128, in a manner that it fills the openings formed in irradiation step 161 according to step d2).

In cutting step 164 according to step e, the raw substrate 152 is cut to obtain the analyte sensor 110.

FIG. 2 further shows optional step f) 166 in which a flux limiting membrane may be applied and optional step g) 168 in which a biocompatibility membrane may be applied to obtain the analyte sensor 110. In the method shown in FIG. 2, steps f) 166 and g) 168 are carried out after cutting step 164 according to step e). It is also possible and in an embodiment even preferred that step f) 166 is carried out after step b) 156 in which the first electrode 118 is prepared.

It is furthermore possible that step f) 166 is carried out after step b) 156 and after step e) 164.

FIGS. 3*a* to 3*e* schematically illustrate selected method steps of an exemplary embodiment of a method for producing an analyte sensor 110 according to the present invention. The shown method steps only show the manufacturing steps of the second electrode 120 and the application of the protective layer 148. The manufacturing of the first electrode 118 is not shown.

Figure 3:
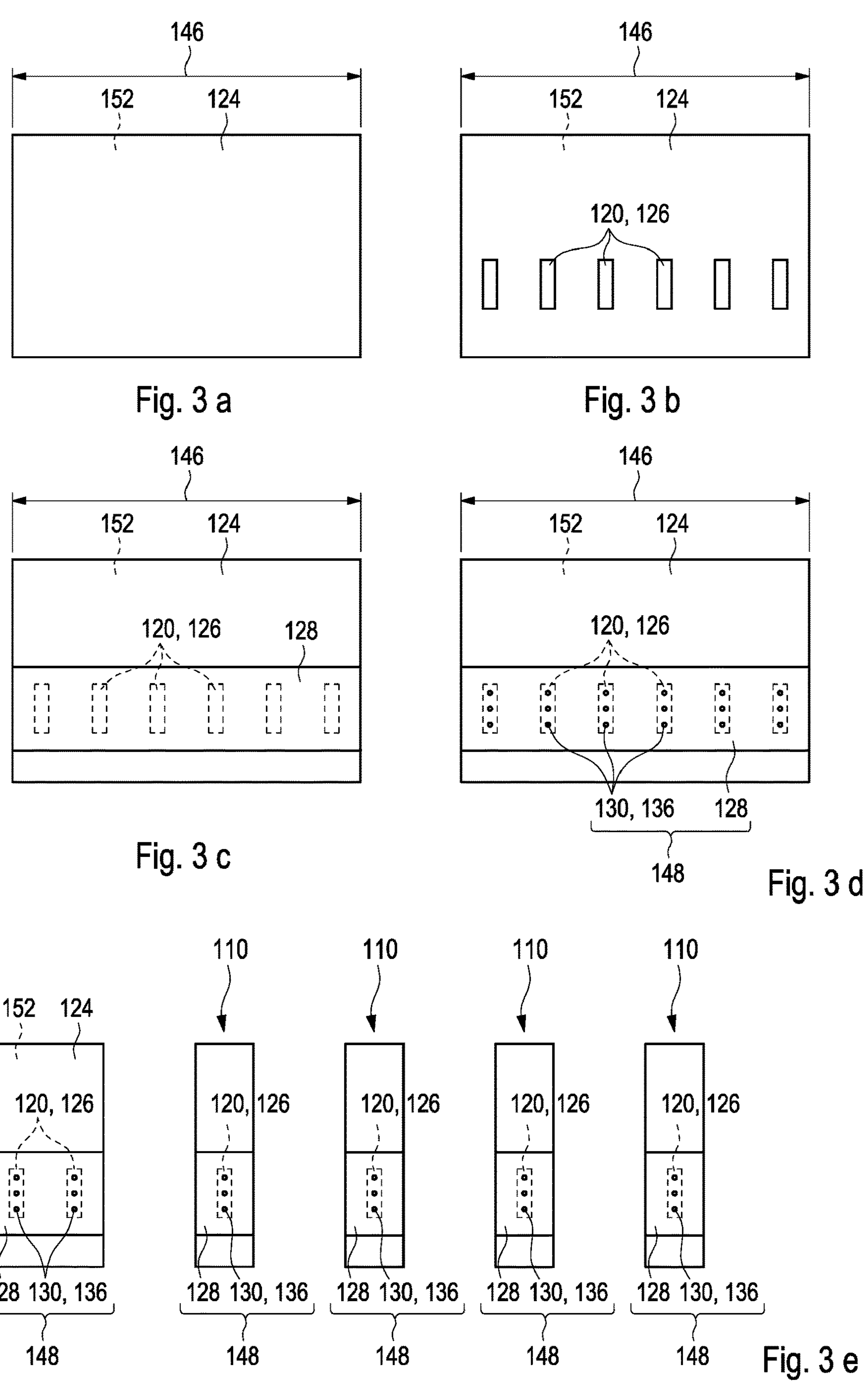

As depicted in FIG. 3*a*, the raw substrate 152 which comprises an insulating material and which comprises a second conductive material 124 is provided according to step a) 154. Preferably, the raw substrate 152 is fully covered by the second conductive material 124.

As depicted in FIG. 3*b*, the silver comprising layer 126 is applied to the second conductive material 124 so that it partially covers the second conductive material 124 according to step c) 158. In the embodiment of FIG. 3*b*, the silver comprising layer 126 is applied in a rectangular shape.

As depicted in FIG. 3*c*, the non-biodegradable hydrophobic polymer 128 is applied in a manner that it fully covers the silver comprising layer 126 according to step d1) 159.

In step d2) 161, the non-biodegradable hydrophobic polymer 128 is irradiated with a laser beam to form openings 136. In step d3) 163, the biodegradable polymer 130 is applied so that it fills the openings 136, thereby forming the protective layer 148 together with the non-biodegradable hydrophobic polymer 128. This situation is shown in FIG. 3*d*).

FIG. 3*e* depicts the analyte sensors 110 which are obtained by cutting the raw substrate 152 according to step e) 164.

LIST OF REFERENCE NUMBERS

110 analyte sensor
112 substrate
114 first side
116 second side
118 first electrode
120 second electrode
122 first conductive material
124 second conductive material
126 silver comprising layer
128 non-biodegradable hydrophobic polymer
130 biodegradable polymer
132 solder mask
134 width of substrate
136 opening
138 width of second electrode
140 length of second electrode
142 width of protective layer
144 length of protective layer
146 width of the raw substrate
148 protective layer
152 raw substrate
154 method step a)
156 method step b)
158 method step c)
159 method step d1)
160 method step d)
161 method step d2)
163 method step d3)
164 method step e)
166 method step f)
168 method step g)

The invention claimed is:

1. An analyte sensor for determining at least one analyte, the analyte sensor comprising:
- a substrate comprising at least one first conductive material and at least one second conductive material,
- at least one first electrode which is located on the at least one first conductive material,
- at least one second electrode which is located on the at least one second conductive material, the at least one second electrode comprising silver,
- at least one protective layer covering the at least one second electrode fully, wherein the at least one protective layer comprises a mixture of at least one biodegradable polymer and at least one non-biodegradable hydrophobic polymer, wherein the at least one protective layer allows transfer of water and chloride anions through the at least one protective layer but restricts transfer of silver cations and silver chloride through the at least one protective layer.

2. The analyte sensor according to claim 1, wherein the substrate comprises a first side and a second side and wherein the at least one first conductive material is located on the first side of the substrate and the at least one second conductive material is located on the second side of the substrate.

3. The analyte sensor according to claim 1, wherein the at least one first electrode is at least one working electrode.

4. The analyte sensor according to claim 1, wherein the at least one second electrode is a counter electrode, a reference electrode or a combined counter/reference electrode.

5. The analyte sensor according to claim 1, wherein the at least one second electrode comprises elemental Ag, AgCl or Ag/AgCl.

6. The analyte sensor according to claim 1, wherein the at least one protective layer is not in direct contact with the at least one first electrode.

7. The analyte sensor according to claim 1, wherein the at least one non-biodegradable hydrophobic polymer comprised in the at least one protective layer forms a layer and said layer comprises at least one opening, wherein the at least one biodegradeable polymer comprised in the protective layer fills the at least one opening.

8. The analyte sensor according to claim 7, wherein the at least one opening has a total area of at most 0.4 $mm^2$.

9. The analyte sensor according to claim 1, wherein the at least one non-biodegradable hydrophobic polymer is selected from the group consisting of polyurethanes, polyureas, polyolefins, poly (meth) acrylates, polyesters, polyethers, polyamides, polyvinylchlorides, Fluorocarbon polymers, polyvinylbutyral-co-vinylalcohol-co-vinylacetate, and UV hardening resins.

10. The analyte sensor according to claim 1, wherein the at least one biodegradable polymer is selected from the group consisting of biodegradable polyanhydrides, biodegradable polyorthoesters, biodegradable polyacetals, biodegradable poly (ether-esters), and biodegradable aliphatic polyesters.

11. The analyte sensor according to claim 1, wherein the at least one protective layer additionally comprises at least one pharmaceutical compound selected from the group consisting of an immunosuppressive agent, an anti-allergic agent, and an anti-inflammatory agent.

12. A method for producing the analyte sensor according to claim 1, the method comprising the steps:
- a) providing a raw substrate, the raw substrate comprising the at least one first conductive material and the at least one second conductive material, b) preparing the at least one first electrode on the at least one first conductive material, c) applying a silver comprising layer in a manner that it partially covers the at least one second conductive material to obtain the at least one second electrode, d) applying the at least one protective layer in a manner that it fully covers the silver comprising layer applied in the step c), e) cutting the raw substrate to obtain the analyte sensor.

13. The method according to claim 12, wherein the step d) comprises the steps:

d1) applying the at least one non-biodegradable hydrophobic polymer in a manner that it fully covers the silver comprising layer, d2) irradiating the at least one non-biodegradable hydrophobic polymer applied in the step d1) with at least one laser beam to form at least one opening so that the at least one opening is designed to provide access to the at least one second electrode for the at least one analyte, d3) applying the at least one biodegradable polymer in a manner that it fills the at least one opening formed in the step d2).

14. The method according to claim 12, wherein the step b) comprises the steps:

b1) applying at least one layer of a sensing material in a manner that it partially covers the at least one first conductive material to obtain the at least one first electrode, b2) optionally applying at least one layer of a flux limiting membrane polymer in a manner that it fully covers the at least one first electrode.

15. An analyte sensor system, comprising:

the analyte sensor according to claim 1, an electronics unit, the electronics unit being configured to electrically connect to the analyte sensor.

* * * * *